United States Patent
Jia et al.

(10) Patent No.: US 10,313,938 B2
(45) Date of Patent: Jun. 4, 2019

(54) DEACTIVATION METHOD AND APPARATUS FOR A SECONDARY CELL AND COMMUNICATIONS SYSTEM

(71) Applicant: FUJITSU LIMITED, Kawasaki-shi, Kanagawa (JP)

(72) Inventors: Meiyi Jia, Beijing (CN); Haibo Xu, Beijing (CN); Hua Zhou, Beijing (CN); Lianhai Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/722,692

(22) Filed: Oct. 2, 2017

(65) Prior Publication Data

US 2018/0027461 A1    Jan. 25, 2018

Related U.S. Application Data

(63) Continuation of application No. PCT/CN2015/075971, filed on Apr. 7, 2015.

(51) Int. Cl.
| | |
|---|---|
| *H04W 36/04* | (2009.01) |
| *H04W 72/04* | (2009.01) |
| *H04W 76/36* | (2018.01) |
| *H04L 5/00* | (2006.01) |
| *H04W 84/04* | (2009.01) |

(52) U.S. Cl.
CPC ............ *H04W 36/04* (2013.01); *H04L 5/001* (2013.01); *H04L 5/0098* (2013.01); *H04W 72/04* (2013.01); *H04W 72/0406* (2013.01); *H04W 76/36* (2018.02); *H04W 72/0453* (2013.01); *H04W 84/042* (2013.01)

(58) Field of Classification Search
None
See application file for complete search history.

(56) References Cited

U.S. PATENT DOCUMENTS 9,622,126 B2 * 4/2017 Uchino .................. H04W 76/36
9,686,814 B2   6/2017 Wang
(Continued)

FOREIGN PATENT DOCUMENTS

| CN | 102780998 A | 11/2012 |
|---|---|---|
| JP | 2013-102432 A | 5/2013 |

(Continued)

OTHER PUBLICATIONS

ZTE, "Activation/Deactivation for SCell carrying PUCCH", Agenda Item: 7.2, 3GPP TSG-RAN WG2 Meeting #89, R2-150150, Athens, Greece, Feb. 9-13, 2015.

(Continued)

*Primary Examiner* — Edan Orgad
*Assistant Examiner* — Emmanuel K Maglo
(74) *Attorney, Agent, or Firm* — Myers Wolin, LLC

(57) ABSTRACT

A deactivation method and apparatus for a secondary cell and a communications system. The deactivation method includes: restarting a deactivation timer associated with a first SCell carrying a PUCCH, in a case where a deactivation timer is restarted or a channel quality indicator report is transmitted in any second SCell in a secondary PUCCH cell group. Hence, a case will not occur where understanding of an activation state of a secondary cell by a UE and a base station is inconsistent due to an UE autonomous deactivation mechanism.

3 Claims, 4 Drawing Sheets

(56) References Cited

U.S. PATENT DOCUMENTS

| | | | |
|---|---|---|---|
| 9,763,151 B2* | 9/2017 | Kim | H04L 5/00 |
| 2011/0134774 A1* | 6/2011 | Pelletier | H04W 52/365 |
| | | | 370/252 |
| 2013/0114398 A1* | 5/2013 | Wang | H04W 76/048 |
| | | | 370/221 |
| 2013/0188473 A1* | 7/2013 | Dinan | H04W 56/0005 |
| | | | 370/216 |
| 2014/0016593 A1 | 1/2014 | Park et al. | |
| 2014/0177500 A1 | 6/2014 | Han et al. | |
| 2015/0092707 A1* | 4/2015 | Kwon | H04W 76/025 |
| | | | 370/329 |
| 2015/0257150 A1 | 9/2015 | Yi et al. | |
| 2015/0304915 A1 | 10/2015 | Uchino et al. | |
| 2016/0278073 A1* | 9/2016 | Dinan | H04W 48/08 |

FOREIGN PATENT DOCUMENTS

| | | |
|---|---|---|
| WO | 2014/021649 A1 | 2/2014 |
| WO | 2014/084111 A1 | 6/2014 |

OTHER PUBLICATIONS

LG Electronics Inc., "Potential issues in MAC for CA enhancement", Agenda Item: 7.2, 3GPP TSG-RAN WG2 Meeting #89, R2-150380, Athens, Greece, Feb. 9-13, 2015.

International Search Report issued for corresponding International Patent Application No. PCT/CN2015/075971, dated Jan. 7, 2016, with an English translation.

Written Opinion of the International Searching Authority issued for corresponding International Patent Application No. PCT/CN2015/075971, dated Jan. 7, 2016, with an English translation.

Office Action issued by the Canadian Intellectual Property Office for corresponding Canadian Patent Application No. 2,982,800, dated Aug. 2, 2018.

Extended European search report with supplementary European search report and the European search opinion issued by the European Patent Office for corresponding European Patent Application No. 15888105.2, dated Oct. 12, 2018.

Intel Corporation: "Considerations for PUCCH on SCell in carrier aggregation", Agenda Item: 7.2, 3GPP TSG-RAN WG2 Meeting #89, R2-150169, Athens, Greece, Feb. 9-13, 2015.

Ericsson: "Handling of cell Activation /Deactivation in Dual connectivity", Agenda Item: 7.2.3, 3GPP TSG-RAN WG2 Meeting #85, R2-140584, Prague, Czech Republic, Feb. 10-14, 2014.

Notification of Reasons for Refusal issued by the Japan Patent Office for corresponding Japanese Patent Application No. 2017-550545, dated Jun. 26, 2018, with an English translation.

Notification of Reasons for Refusal issued by the Japan Patent Office for corresponding Japanese Patent Application No. 2017-550545, dated Jan. 22, 2019, with an English translation.

* cited by examiner

DEACTIVATION METHOD AND APPARATUS FOR A SECONDARY CELL AND COMMUNICATIONS SYSTEM

CROSS REFERENCE TO RELATED APPLICATIONS

This application is a continuation application of International Application PCT/CN2015/075971 filed on Apr. 7, 2015, the entire contents of which are incorporated herein by reference.

TECHNICAL FIELD

This disclosure relates to the field of communications technologies, and in particular to a deactivation method and an apparatus for a secondary cell and a communications system.

BACKGROUND

Currently, when a user equipment (UE) needs and has an ability of carrier aggregation (CA), a base station considers the ability of CA of the UE and selects available carriers for the UE, and configures a cell as a secondary cell (SCell) of the UE via a radio resource control (RRC) message.

For the sake of punctuality, if it is deemed that the configured SCell may immediately be used for data transmission, then the SCell needs to be cancelled, and the UE does not use resource of the SCell to transmit data any longer when the SCell is not used considering the resource efficiency; and when the cell is again needed for data transmission, the cell is again needed to be configured as an SCell via an RRC message.

When a type of traffic occurring frequently of a short duration and a large traffic amount is taken into account, frequently configuring/de-configuring an SCell in such a way will consume a large amount of RRC messages; and at the same time, punctuality of an RRC message is relatively poor, and if an SCell is configured via an RRC message when needed, it is possible that timeliness of such a traffic cannot be satisfied. On the contrary, if the cell is always taken as an SCell so as to save RRC messages and ensure timeliness of a traffic, even if there exists no traffic for transmission, resources cannot be fully used, spectral utilization is low, and a throughput of the cell drops therewith.

Thus, a new state is introduced for an SCell: an activation state or a deactivation state. UE only monitors an activated SCell, and transmits data only in the activated SCell. When a base station configures CA UE with an available SCell, both the base station and the UE default that the SCell is in a deactivation state. When needed, the base station sets the SCell to be in an activation state via an activation media access control (MAC) control element (CE); otherwise, the base station sets the SCell to be in a deactivation state via a deactivation MAC CE.

In some cases, it is possible that a transmission failure of a deactivation MAC CE deactivating an SCell occurs, hence, the base station will deem that the SCell is in a deactivation state, and the UE will deem that the SCell is in an activation state; and the UE may perform autonomous uplink transmission, such as a sounding reference signal (SRS), on the SCell; which may pose interference on other uplink transmission, and is disadvantageous to energy-saving. Therefore, an UE autonomous deactivation mechanism is introduced.

That is, in order to unify the state of an SCell activation/deactivation by the UE and the base station, an UE autonomous deactivation mechanism is introduced, namely, a deactivation timer is maintained for each SCell. When a base station activates an SCell via an activation MAC CE, both the base station and the UE deem that the SCell is activated, and start a deactivation timer for the SCell; and when a deactivation MAC CE is successfully transmitted or the deactivation timer associated with the SCell expires, both the UE and the base station deem that the SCell is deactivated.

If a physical downlink control channel (PDCCH) indicating an uplink grant or downlink assignment is received in the activated SCell, or a PDCCH scheduling the SCell, including an uplink grant and downlink assignment, is received in another serving cell, the UE restarts the deactivation timer associated with the SCell.

Based on a demand of the UE for traffics, if an SCell is not needed temporarily, the base station may deactivate the SCell; and even if the UE does not receive a deactivation MAC CE, only if the base station does not schedule the SCell and not transmit a PDCCH in the SCell within a period of time, and the SCell can be autonomously deactivated by the UE via the deactivation timer.

Based on the UE autonomous deactivation mechanism, the activation state of the SCell of the CA UE may be appropriately maintained. Although both the base station and the UE maintain a deactivation timer for each SCell, values of these timers are identical, which may be provided by the base station via the RRC message, and the default value of the timers is an infinite value.

On the other hand, in an existing LTE system, for CA UE, only a primary cell (PCell) is configured with one or more physical uplink control channels (PUCCHs), and almost all uplink control information (UCI) in all cells is transmitted to a base station (such as an eNB) via the PUCCHs of the PCell.

As occurrence of a demand for new traffics, the number of downlink carriers of CA becomes larger and larger, and the number of UE (including CA UE and non-CA UE) becomes larger and larger, problems will occur when UCI is only transmitted in a PCell. In order to offload for transmitting UCI, in addition to transmitting PUCCHs in the PCell, a base station may further select an SCell for UE having an ability of UL CA, which is used for transmitting PUCCHs. Thus, UCI related to the PCell is transmitted in the PCell, UCI of an SCell carrying PUCCHs is transmitted in the SCell, and UCI of other SCells is configured by the base station to be transmitted in the PCell or is configured to be transmitted in the SCell carrying PUCCHs.

That is, in a current CA, there exist two serving cells carrying PUCCHs, one is the PCell, and the other is the SCell carrying PUCCHs. The PCell and all normal SCells whose UCI is transmitted via the PUCCHs of the PCell constitute a primary PUCCH cell group, and the SCell carrying PUCCHs and all normal SCells whose UCI is transmitted via the PUCCHs of the SCell constitute a secondary PUCCH cell group. The primary PUCCH cell group and secondary PUCCH cell group are collectively referred to as a PUCCH cell group.

It should be appreciated that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that in some cases, the base station deems that the SCell carrying PUCCHs (a first SCell) is activated, and the UE deems that the SCell (the first SCell) is deactivated, in which cases even though there exists another normal SCell (a second SCell) associated with the PUCCHs in the SCell (the first SCell) and the base station schedule the SCell (the second SCell), downlink transmission of the SCell (the second SCell) cannot be operated, as transmitting uplink feedback of the SCell (the second SCell) needs to use PUCCHs, while the SCell carrying the PUCCHs (the first SCell) has been processed by the UE by taking it as a deactivated SCell, which is unable to transmit PUCCHs.

Embodiments of this disclosure provide a deactivation method and apparatus for a secondary cell and a communications system, used for solving a problem that understanding of an activation state of a secondary cell by the UE and the base station is inconsistent due to the UE autonomous deactivation mechanism.

According to a first aspect of the embodiments of this disclosure, there is provided a deactivation method for a secondary cell, applicable to a UE, the UE being configured with a first SCell carrying a PUCCH and a second SCell carrying no PUCCH, the first SCell and one or more second SCells transmitting uplink control information via the PUCCH constituting a secondary PUCCH cell group;

the deactivation method includes:
restarting a deactivation timer associated with the first SCell carrying the PUCCH, in a case where a deactivation timer is restarted or a channel quality indicator report is transmitted in any second SCell in the secondary PUCCH cell group.

According to a second aspect of the embodiments of this disclosure, there is provided a deactivation apparatus for a secondary cell, configured in a UE, the UE being configured with a first SCell carrying a physical uplink control channel (PUCCH) and a second SCell carrying no PUCCH, the first SCell and one or more second SCells transmitting uplink control information via the PUCCH constituting a secondary PUCCH cell group;

the deactivation apparatus includes:
a restarting unit configured to restart a deactivation timer associated with the first SCell carrying the PUCCH, in a case where a deactivation timer is restarted or a channel quality indicator report is transmitted in any second SCell in the secondary PUCCH cell group.

According to a third aspect of the embodiments of this disclosure, there is provided a deactivation method for a secondary cell, applicable to a UE, the UE being configured with a first SCell carrying a PUCCH and a second SCell carrying no PUCCH;

the deactivation method includes:
configuring the first SCell carrying the PUCCH as not operating a deactivation timer, or configuring a value of a deactivation timer of the first SCell as being greater than a value of a deactivation timer of the second SCell.

According to a fourth aspect of the embodiments of this disclosure, there is provided a deactivation apparatus for a secondary cell, configured in a UE, the UE being configured with a first SCell carrying a PUCCH and a second SCell carrying no PUCCH;

the deactivation apparatus includes:
a configuring unit configured to configure the first SCell carrying the PUCCH as not operating a deactivation timer, or configure a value of a deactivation timer of the first SCell as being greater than a value of a deactivation timer of the second SCell.

According to a fifth aspect of the embodiments of this disclosure, there is provided a deactivation method for a secondary cell, applicable to a UE, the UE being configured with a first SCell carrying a PUCCH and a second SCell carrying no PUCCH, the first SCell and one or more second SCells transmitting uplink control information via the PUCCH of the first SCell constituting a secondary PUCCH cell group; the UE being further configured with a primary cell (PCell) carrying a PUCCH, the PCell and one or more second SCells transmitting uplink control information via the PUCCH of the PCell constituting a primary PUCCH cell group;

the deactivation method includes:
configuring the secondary PUCCH cell group with a secondary cell group deactivation timer; and
restarting the secondary cell group deactivation timer in a case where any SCell of the secondary PUCCH cell group satisfies a timer restart condition.

According to a sixth aspect of the embodiments of this disclosure, there is provided a deactivation apparatus for a secondary cell, configured in a UE, the UE being configured with a first SCell carrying a PUCCH and a second SCell carrying no PUCCH, the first SCell and one or more second SCells transmitting uplink control information via the PUCCH of the first SCell constituting a secondary PUCCH cell group; the UE being further configured with a primary cell (PCell) carrying a PUCCH, the PCell and one or more second SCells transmitting uplink control information via the PUCCH of the PCell constituting a primary PUCCH cell group;

the deactivation apparatus includes:
a configuring unit configured to configure the secondary PUCCH cell group with a secondary cell group deactivation timer; and
a restarting unit configured to restart the secondary cell group deactivation timer in a case where any SCell of the secondary PUCCH cell group satisfies a timer restart condition.

According to a seventh aspect of the embodiments of this disclosure, there is provided a communications system, including:
a UE configured with a first SCell carrying a PUCCH and a second SCell carrying no PUCCH, the first SCell and one or more second SCells transmitting uplink control information via the PUCCH of the first SCell constituting a secondary PUCCH cell group; the UE being further configured with a PCell carrying a PUCCH, the PCell and one or more second SCells transmitting uplink control information via the PUCCH of the PCell constituting a primary PUCCH cell group;

the UE is configured to restart a deactivation timer associated with the first SCell carrying the PUCCH, in a case where a deactivation timer is restarted or a channel quality indicator report is transmitted in any second SCell in the secondary PUCCH cell group;

or, the UE is configured to configure the first SCell carrying the PUCCH as not operating a deactivation timer, or configure a value of a deactivation timer of the first SCell as being greater than a value of a deactivation timer of the second SCell;

or, the UE is configured to configure the secondary PUCCH cell group with a secondary cell group deactivation timer; and restart the secondary cell group deactivation timer in a case where any SCell of the secondary PUCCH cell group satisfies a timer restart condition.

According to another aspect of the embodiments of this disclosure, there is provided a computer readable program code, which, when executed in a UE, will cause a computer unit to carry out the deactivation method for a secondary cell as described above in the UE.

According to a further aspect of the embodiments of this disclosure, there is provided a computer readable medium, including a computer readable program code, which will cause a computer unit to carry out the deactivation method for a secondary cell as described above in a UE.

An advantage of the embodiments of this disclosure exists in that a new deactivation timer restart triggering mechanism is introduced for an SCell carrying PUCCHs, or an UE autonomous deactivation mechanism is not configured for an SCell carrying PUCCHs, or a new deactivation timer mechanism is introduced for a secondary PUCCH cell group. Hence, a case will not occur where understanding of an activation state of a secondary cell by the UE and the base station is inconsistent due to the UE autonomous deactivation mechanism.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

An example of a scenario is given below to describe a case where the following problem will occur: "a base station deems that an SCell carrying one or more PUCCHs is in an activated state, while UE deems that the SCell is in a deactivated state".

Figure 1:
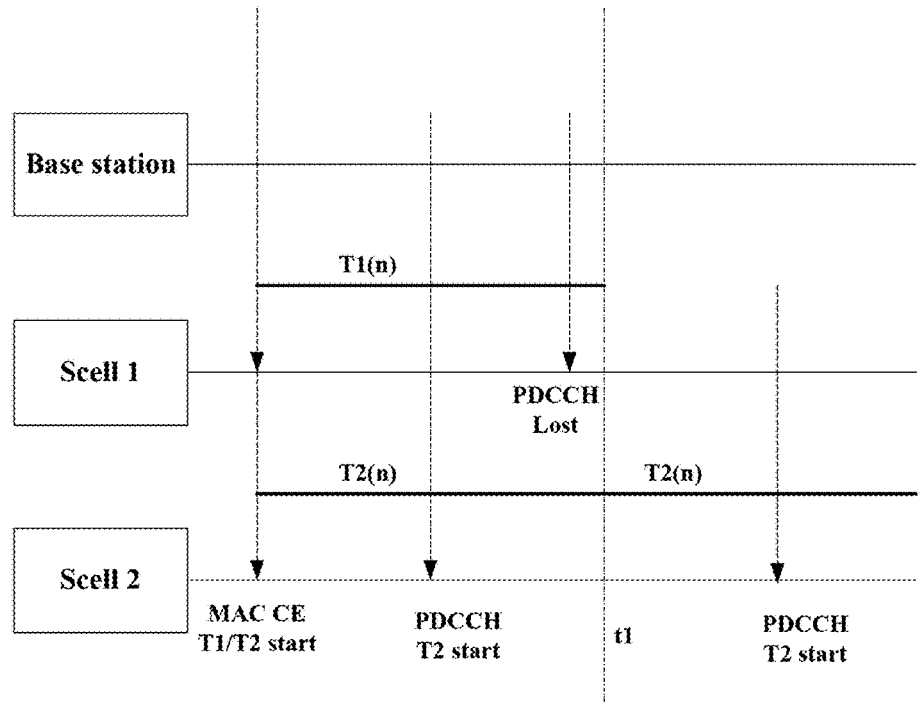
FIG. 1 is a schematic diagram of an example of a scenario of an embodiment of this disclosure.

FIG. 1 is a schematic diagram of the example of the scenario of an embodiment of this disclosure. As shown in FIG. 1, within a transmission time interval (TTI), a base station schedules SCell 1 or schedules other SCells in a cross-carrier manner by transmitting a PDCCH in SCell 1. However, the transmission of the PDCCH fails, and a UE does not receive the PDCCH. Hence, only the base station restarts a deactivation timer associated with SCell 1, and the UE does not restart the timer.

For example, at a t1 moment, the base station deems that both SCell 1 and SCell 2 are in an activated state, and both their deactivation timers are running; while the UE deems that SCell 1 is deactivated, T1 expires, and at the same time, SCell 2 is in the activated state, and T2 still is running.

In such a case, the base station may schedule SCell 1/SCell 2 to transmit downlink data. In a case of self-scheduling, the base station fails in scheduling SCell 1 in a self-scheduling manner via SCell 1, since the UE deems that SCell 1 is deactivated at this moment, and does not monitor SCell 1. Furthermore, the base station may transmit downlink assignment via a PDCCH of SCell 2 to schedule SCell 2 to perform downlink transmission; however, it cannot operate normally, as feedback of downlink data transmitted in the SCell needs to be transmitted in a PUCCH in SCell 1, and it is commonly known that a deactivated SCell cannot transmit UCI. For the cross-carrier scheduling, the base station fails in scheduling SCell 2 in a cross-carrier manner via SCell 1, as the UE does not monitor SCell 1 which is deemed by the UE as being deactivated at this moment; or scheduling SCell 1 by the base station in a cross-carrier manner via SCell 2 still cannot be achieved, as the UE deems that SCell 1 is deactivated at this moment.

Such a problem also exists actually in CA of previous versions; however, as only a single SCell is concerned, and transmission of other SCells is not affected, the base station may await to detect, find and process by itself. While after the PUCCH in the SCell is introduced, if such a problem occurs in the SCell carrying the PUCCH, besides this SCell, downlinks of all SCells performing transmission of uplink control information via the PUCCH of the SCell cannot operate, and this is serious degradation of quality. Therefore, such a problem needs to be solved.

Embodiment 1

An embodiment of this disclosure provides a deactivation method for a secondary cell, applicable to a UE, the UE being configured with a first SCell carrying a PUCCH and a second SCell carrying no PUCCH, the first SCell and one or more second SCells transmitting uplink control information via the PUCCH constituting a secondary PUCCH cell group.

Figure 2:
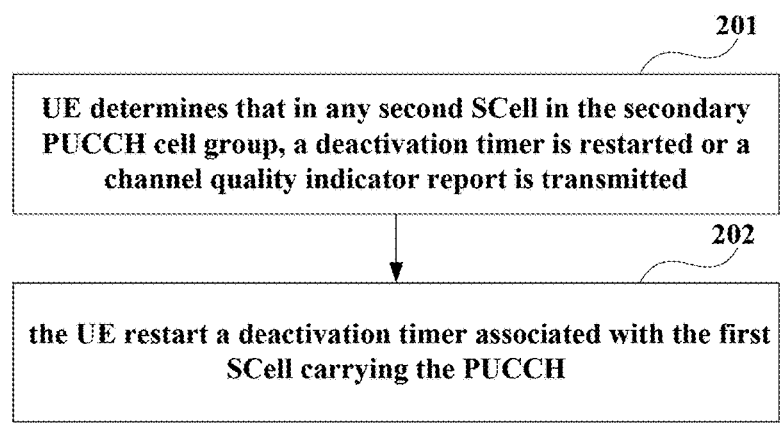
FIG. 2 is a flowchart of the deactivation method of Embodiment 1 of this disclosure.

FIG. 2 is a flowchart of the deactivation method of the embodiment of this disclosure. As shown in FIG. 2, the deactivation method includes:

step 201: the UE determines that in any second SCell in the secondary PUCCH cell group, a deactivation timer is restarted or a channel quality indicator report is transmitted; and step 202: the UE restarts a deactivation timer associated with the first SCell carrying the PUCCH.

In this embodiment, a new triggering mechanism to restart the deactivation timer may be introduced for an SCell carrying the PUCCH (a first SCell).

In an implementation, in a case where a deactivation timer of any second SCell in the secondary PUCCH cell group is restarted, the UE restarts the deactivation timer associated with the first SCell carrying the PUCCH.

For example, the UE may determine that a PDCCH indicating an uplink grant or downlink assignment is received in the any second SCell, or a PDCCH scheduling the any second SCell and indicating an uplink grant or downlink assignment is received in another serving cell, in which cases, a deactivation timer of the any second SCell is restarted, and a deactivation timer associated with the first SCell carrying the PUCCH is restarted.

In another implementation, in a case where a channel quality indicator (CQI) report of any second SCell in the secondary PUCCH cell group is transmitted, the UE restarts the deactivation timer associated with the first SCell carrying the PUCCH.

For example, the UE may determine that a PDCCH indicating an uplink grant or downlink assignment is received in the any second SCell, or a PDCCH scheduling the any second SCell and indicating an uplink grant or downlink assignment is received in another serving cell, or whether the any second SCell transmits a CQI report, in which cases, a deactivation timer associated with the first SCell carrying the PUCCH is restarted.

Thus, if the deactivation timer of the any second SCell in the secondary PUCCH cell group is restarted, or the CQI report is transmitted, the deactivation timer associated with the SCell carrying the PUCCH is also restarted, and a case where downlink transmission of a normal SCell cannot operate will not occur. Such a scheme may ensure that a CA performance is at least identical to previous ones after the PUCCH in the SCell is introduced.

It can be seen from the above embodiment that a new triggering mechanism to restart the deactivation timer is introduced for an SCell carrying one or more PUCCHs, hence, a case will not occur where understanding of an activation state of a secondary cell by the UE and the base station is inconsistent due to the UE autonomous deactivation mechanism.

Embodiment 2

An embodiment of this disclosure provides a deactivation apparatus for an SCell, configured in a UE. The embodiment of this disclosure corresponds to the deactivation method of Embodiment 1, with identical contents being not going to be described herein any further.

In this embodiment, the UE is configured with a first SCell carrying a PUCCH and a second SCell carrying no PUCCH, the first SCell and one or more second SCells transmitting uplink control information via the PUCCH constituting a secondary PUCCH cell group.

Figure 3:
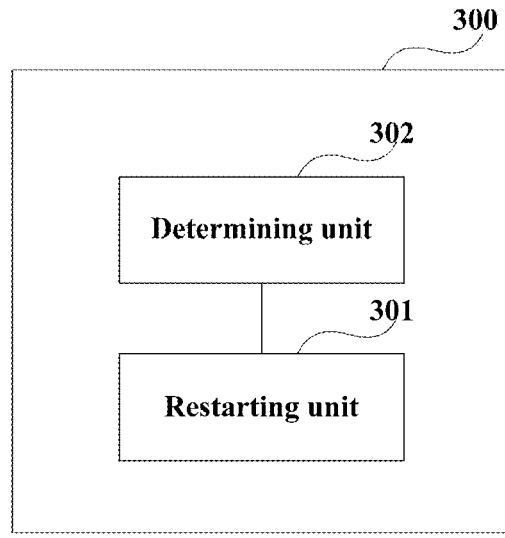
FIG. 3 is a schematic diagram of the deactivation apparatus of Embodiment 2 of this disclosure.

FIG. 3 is a schematic diagram of the deactivation apparatus of the embodiment of this disclosure. As shown in FIG. 3, the deactivation apparatus 300 includes:

a restarting unit 301 configured to restart a deactivation timer associated with the first SCell carrying the PUCCH, in a case where a deactivation timer is restarted or a channel quality indicator report is transmitted in any second SCell in the secondary PUCCH cell group.

As shown in FIG. 3, the deactivation apparatus 300 may further include:

a determining unit 302 configured to determine whether a PDCCH indicating an uplink grant or downlink assignment is received in the any second SCell, or whether a PDCCH scheduling the any second SCell and indicating an uplink grant or downlink assignment is received in another serving cell.

In an implementation, the determining unit 302 may configured to determine that a PDCCH indicating an uplink grant or downlink assignment is received in the any second SCell, or a PDCCH scheduling the any second SCell and indicating an uplink grant or downlink assignment is received in another serving cell. The restarting unit 301 may configured to restart a deactivation timer of the any second SCell, and restart a deactivation timer associated with the first SCell carrying the PUCCH.

In another implementation, the determining unit 302 may configured to determine that a PDCCH indicating an uplink grant or downlink assignment is received in the any second SCell, or a PDCCH scheduling the any second SCell and indicating an uplink grant or downlink assignment is received in another serving cell, or the any second SCell transmits a CQI report. The restarting unit 301 may configured to restart a deactivation timer associated with the first SCell carrying the PUCCH.

It can be seen from the above embodiment that a new triggering mechanism to restart the deactivation timer is introduced for an SCell carrying one or more PUCCHs, hence, a case will not occur where understanding of an activation state of a secondary cell by the UE and the base station is inconsistent due to the UE autonomous deactivation mechanism.

Embodiment 3

An embodiment of this disclosure provides a deactivation method for a secondary cell, applicable to UE, the UE being configured with a first SCell carrying a PUCCH and a second SCell carrying no PUCCH.

Figure 4:
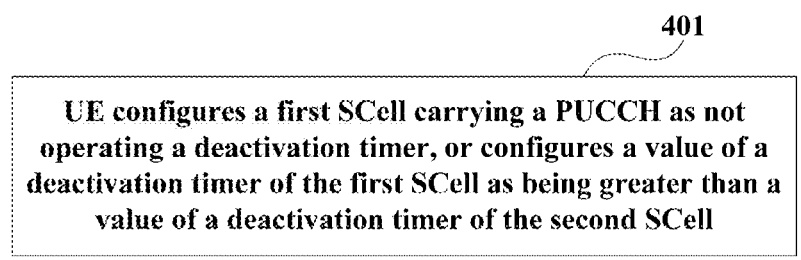
FIG. 4 is a flowchart of the deactivation method of Embodiment 3 of this disclosure.

FIG. 4 is a flowchart of the deactivation method of the embodiment of this disclosure. As shown in FIG. 4, the method includes:

step 401: the UE configures the first SCell carrying a PUCCH as not operating a deactivation timer, or configures a value of a deactivation timer of the first SCell as being greater than a value of a deactivation timer of the second SCell.

In this embodiment, an UE autonomous deactivation mechanism may not be configured for the SCell carrying PUCCHs.

In an implementation, the UE does not operate a deactivation timer for the first SCell carrying a PUCCH, and starts a deactivation timer for the second SCell carrying no PUCCH.

In another implementation, the UE configures the value of the deactivation timer of the first SCell as being greater than the value of the deactivation timer of the second SCell. For example, the value of the deactivation timer of the first SCell may be configured as being much greater than the value of the deactivation timer of the second SCell, such as being infinite.

That is, different values of deactivation timers may be introduced for different SCells; for example, a value of a deactivation timer of an SCell carrying a PUCCH may be set to be, for example, infinite, and in order to reuse an existing mechanism as possible, values of other normal SCells carrying no PUCCH may be set to be identical. Hence, the value of the timer configured by the base station is only applicable to an normal SCell carrying no PUCCH.

When an SCell is activated, a deactivation timer is started. If the SCell is an SCell carrying a PUCCH, a default value being infinite is used; otherwise, the SCell is a normal SCell carrying no PUCCH, and a value of timer configured by the base station is used according to an existing mechanism, and if a value of timer is not configured by the base station, a default value being infinite is used.

However, this disclosure is not limited to setting the value of the deactivation timer of the first SCell as being infinite, and it may also be that the value of the deactivation timer of the first SCell is set to be much greater than the value of the deactivation timer of the second SCell. For example, the value of the deactivation timer of the first SCell may be set to be a maximum value that the timer has, etc. And a particular value may be set according to an actual situation.

In this embodiment, as the SCell carrying a PUCCH can only be deactivated by a deactivating medium access control (MAC) control element (CE), the above technical problem that "a base station deems that the SCell is in an activated state, while a UE deems that the SCell is in a deactivated state" will not occur.

It can be seen from the above embodiment that an UE autonomous deactivation mechanism is not configured for an SCell carrying one or more PUCCHs, hence, a case will not occur where understanding of an activation state of a secondary cell by the UE and the base station is inconsistent due to the UE autonomous deactivation mechanism.

Embodiment 4

An embodiment of this disclosure provides a deactivation apparatus for an SCell, configured in a UE. The embodiment of this disclosure corresponds to the deactivation method of Embodiment 3, with identical contents being not going to be described herein any further.

In this embodiment, the UE is configured with a first SCell carrying a PUCCH and a second SCell carrying no PUCCH.

Figure 5:
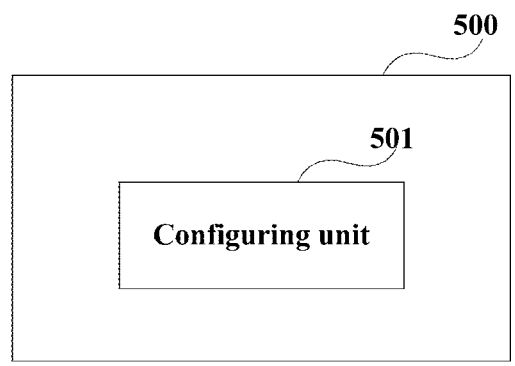
FIG. 5 is a schematic diagram of the deactivation apparatus of Embodiment 4 of this disclosure.

FIG. 5 is a schematic diagram of the deactivation apparatus of the embodiment of this disclosure. As shown in FIG. 5, the deactivation apparatus 500 includes:

a configuring unit 501 configured to configure the first SCell carrying a PUCCH as not operating a deactivation timer, or configure a value of a deactivation timer of the first SCell as being greater than a value of a deactivation timer of the second SCell.

In an implementation, the configuring unit 501 may configure the first SCell carrying a PUCCH as not operating a deactivation timer, and configure the second SCell carrying no PUCCH as operating a deactivation timer.

In another implementation, the configuring unit 501 may configure the value of the deactivation timer of the first SCell as being greater than the value of the deactivation timer of the second SCell. For example, the configuring unit 501 may configure the value of the deactivation timer of the first SCell as being infinite.

In this embodiment, the SCell carrying a PUCCH may only be deactivated by a deactivating MAC CE.

It can be seen from the above embodiment that an UE autonomous deactivation mechanism is not configured for an SCell carrying PUCCHs, hence, a case will not occur where understanding of an activation state of a secondary cell by the UE and the base station is inconsistent due to the UE autonomous deactivation mechanism.

Embodiment 5

An embodiment of this disclosure provides a deactivation method for a secondary cell, applicable to a UE, the UE being configured with a first SCell carrying a PUCCH and a second SCell carrying no PUCCH, the first SCell and one or more second SCells transmitting uplink control information via the PUCCH of the first SCell constituting a secondary PUCCH cell group;

the UE being further configured with a PCell carrying a PUCCH, the PCell and one or more second SCells transmitting uplink control information via the PUCCH of the PCell constituting a primary PUCCH cell group.

Figure 6:
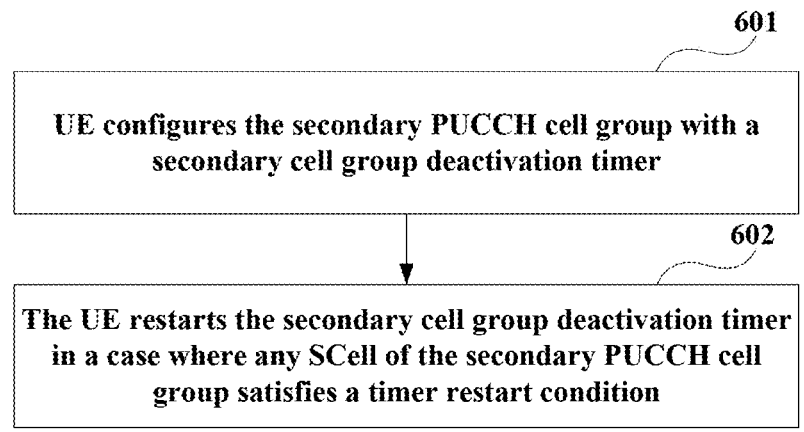
FIG. 6 is a flowchart of the deactivation method of Embodiment 5 of this disclosure.

FIG. 6 is a flowchart of the deactivation method of the embodiment of this disclosure. As shown in FIG. 6, the method includes:

step 601: the UE configures the secondary PUCCH cell group with a secondary cell group deactivation timer; and step 602: the UE restarts the secondary cell group deactivation timer in a case where any SCell of the secondary PUCCH cell group satisfies a timer restart condition.

In this embodiment, a deactivation timer mechanism based on a PUCCH cell group is introduced.

In an implementation, the UE may further configure the primary PUCCH cell group with a primary cell group deactivation timer, and restarts the primary cell group deactivation timer in a case where any SCell of the primary PUCCH cell group satisfies a timer restart condition.

That is, in this implementation, only two deactivation timers are maintained for each UE, and each PUCCH cell group is respectively configured with a deactivation timer. Of course, for the primary PUCCH cell group, the deactivation timer is only applicable to one or more SCells, but is not applicable to the PCell. And a deactivation timer of a group is restarted only if any cell in the group satisfies the timer restart condition.

For example, if a PDCCH indicating an uplink grant or downlink assignment is received in the any SCell of the secondary PUCCH cell group, or a PDCCH scheduling the any SCell and indicating an uplink grant or downlink assignment is received in another serving cell, the deactivation timer of the secondary cell group is restarted.

If a PDCCH indicating an uplink grant or downlink assignment is received in the any SCell of the primary PUCCH cell group, or a PDCCH scheduling the any SCell and indicating an uplink grant or downlink assignment is received in another serving cell, the deactivation timer of the primary cell group is restarted.

In this implementation, when a cross-carrier scheduling crossing the PUCCH cell groups occurs, two deactivation timers may be restarted at the same time. Similar to an existing mechanism, values of the two deactivation timers here may be configured by the base station, and may be identical.

In another implementation, for the secondary PUCCH cell group only, a deactivation timer based on the secondary PUCCH cell group is maintained. And for the primary PUCCH cell group, based on an existing mechanism, a deactivation timer based on an SCell is still maintained.

For example, if a PDCCH indicating an uplink grant or downlink assignment is received in the any SCell of the secondary PUCCH cell group, or a PDCCH scheduling the any SCell and indicating an uplink grant or downlink assignment is received in another serving cell, the deactivation timer of the secondary cell group is restarted.

If a PDCCH indicating an uplink grant or downlink assignment is received in the any SCell of the primary PUCCH cell group, or a PDCCH scheduling the any SCell and indicating an uplink grant or downlink assignment is received in another serving cell, the deactivation timer of the any SCell is restarted.

In this implementation, similar to an existing mechanism, values of the multiple deactivation timers here may be configured by the base station, and may be identical.

It can be seen from the above embodiment that a new deactivation timer mechanism is introduced for the PUCCH cell group, hence, a case will not occur where understanding of an activation state of a secondary cell by the UE and the base station is inconsistent due to the UE autonomous deactivation mechanism.

Embodiment 6

An embodiment of this disclosure provides a deactivation apparatus for an SCell, configured in a UE. The embodiment of this disclosure corresponds to the deactivation method of Embodiment 5, with identical contents being not going to be described herein any further.

In this embodiment, the UE is configured with a first SCell carrying a PUCCH and a second SCell carrying no PUCCH, the first SCell and one or more second SCells transmitting uplink control information via the PUCCH of the first SCell constituting a secondary PUCCH cell group; the UE being further configured with a PCell carrying a PUCCH, the PCell and one or more second SCells transmitting uplink control information via the PUCCH of the PCell constituting a primary PUCCH cell group.

Figure 7:
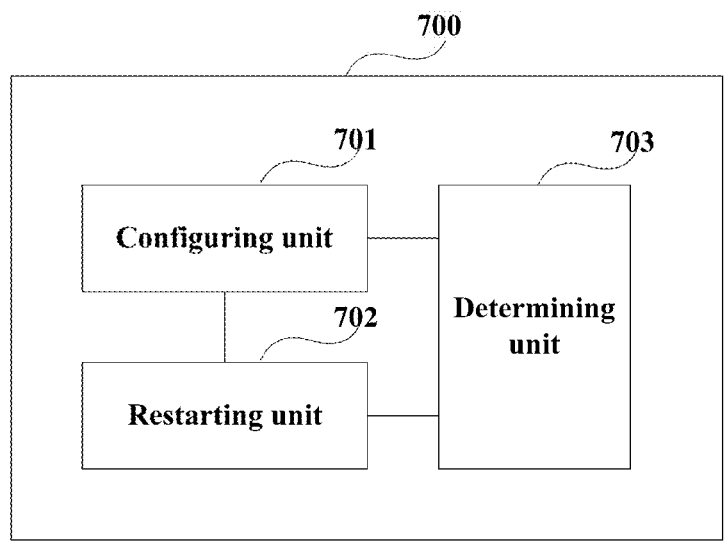
FIG. 7 is a schematic diagram of the deactivation apparatus of Embodiment 6 of this disclosure.

FIG. 7 is a schematic diagram of the deactivation apparatus of the embodiment of this disclosure. As shown in FIG. 7, the deactivation apparatus 700 includes:

a configuring unit 701 configured to configure the secondary PUCCH cell group with a secondary cell group deactivation timer; and a restarting unit 702 configured to restart the secondary cell group deactivation timer in a case where any SCell of the secondary PUCCH cell group satisfies a timer restart condition.

In an implementation, as shown in FIG. 7, the deactivation apparatus 700 may further include:

a determining unit 703 configured to determine whether a PDCCH indicating an uplink grant or downlink assignment is received in the any SCell of the secondary PUCCH cell group, or whether a PDCCH scheduling the any SCell and indicating an uplink grant or downlink assignment is received in another serving cell.

And the restarting unit 702 is further configured to restart the secondary cell group deactivation timer in a case where the PDCCH indicating an uplink grant or downlink assignment is received in the any SCell of the secondary PUCCH cell group, or the PDCCH scheduling the any SCell and indicating an uplink grant or downlink assignment is received in another serving cell.

In another implementation, the configuring unit 701 is further configured to configure the primary PUCCH cell group with a primary cell group deactivation timer. And the deactivation apparatus 700 may further include:

the determining unit 703 configured to determine whether a PDCCH indicating an uplink grant or downlink assignment is received in the any SCell of the secondary PUCCH cell group, or whether a PDCCH scheduling the any SCell and indicating an uplink grant or downlink assignment is received in another serving cell; and to determine whether a PDCCH indicating an uplink grant or downlink assignment is received in the any SCell of the primary PUCCH cell group, or whether a PDCCH scheduling the any SCell and indicating an uplink grant or downlink assignment is received in another serving cell.

And the restarting unit 702 is further configured to restart the secondary cell group deactivation timer when a PDCCH indicating an uplink grant or downlink assignment is received in the any SCell of the secondary PUCCH cell group, or a PDCCH scheduling the any SCell and indicating an uplink grant or downlink assignment is received in another serving cell; and to restart the primary cell group deactivation timer when a PDCCH indicating an uplink grant or downlink assignment is received in the any SCell of the primary PUCCH cell group, or a PDCCH scheduling the any SCell and indicating an uplink grant or downlink assignment is received in another serving cell.

It can be seen from the above embodiment that a new deactivation timer mechanism is introduced for the PUCCH cell group, hence, a case will not occur where understanding of an activation state of a secondary cell by the UE and the base station is inconsistent due to the UE autonomous deactivation mechanism.

Embodiment 7

An embodiment of this disclosure provides a UE, configured with the above-described deactivation apparatus 300, or 500, or 700.

In this embodiment, the UE is configured with a first SCell carrying a PUCCH and a second SCell carrying no PUCCH, the first SCell and one or more second SCells transmitting uplink control information via the PUCCH constituting a secondary PUCCH cell group; and the UE is further configured with a PCell carrying a PUCCH, the PCell and one or more second SCells transmitting uplink control information via the PUCCH of the PCell constituting a primary PUCCH cell group.

Figure 8:
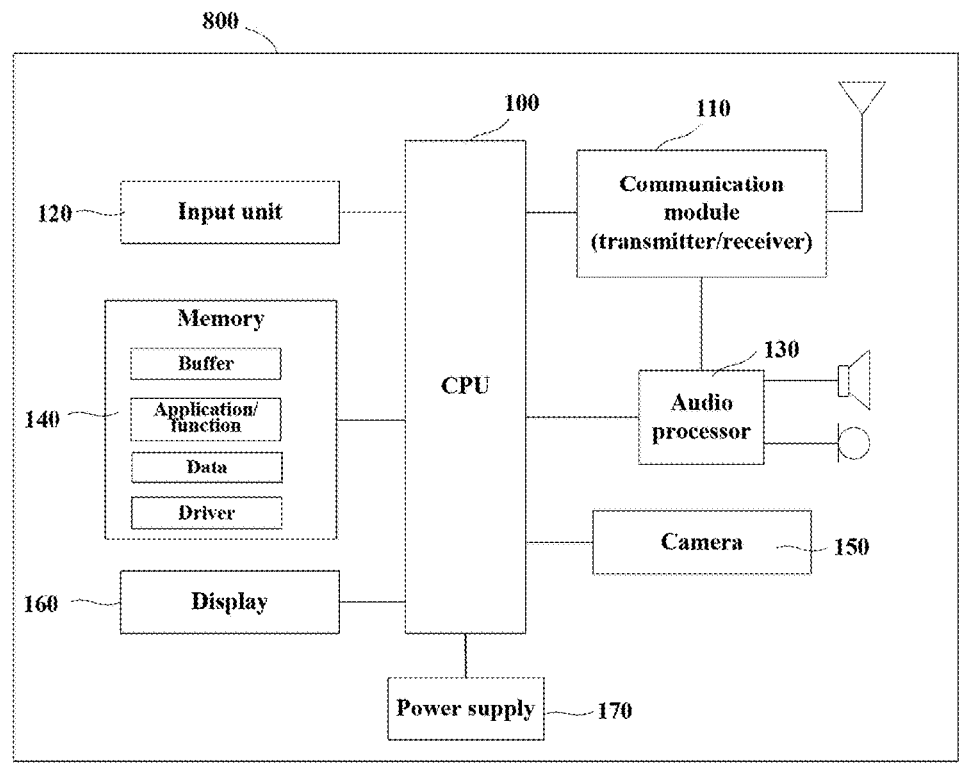
FIG. 8 is a schematic diagram of the UE of Embodiment 7 of this disclosure.

FIG. 8 is a schematic diagram of the UE of the embodiment of this disclosure. As shown in FIG. 8, the UE 800 may include a central processing unit (CPU) 100 and a memory 140, the memory 140 being coupled to the central processing unit 100. It should be noted that this figure is illustrative only, and other types of structures may also be used, so as to supplement or replace this structure and achieve a telecommunications function or other functions.

In an implementation, the functions of the deactivation apparatus 300, or 500, or 700, may be integrated into the central processing unit 100. The central processing unit 100 may be configured to perform following control: restart a deactivation timer associated with the first SCell carrying the PUCCH, in a case where a deactivation timer is restarted or a channel quality indicator report is transmitted in any second SCell in the secondary PUCCH cell group;

or, configure the first SCell carrying a PUCCH as not operating a deactivation timer, or configure a value of a deactivation timer of the first SCell as being greater than a value of a deactivation timer of the second SCell;

or, configure the secondary PUCCH cell group with a secondary cell group deactivation timer; and restart the secondary cell group deactivation timer in a case where any SCell of the secondary PUCCH cell group satisfies a timer restart condition.

In another implementation, the deactivation apparatus 300, or 500, or 700 and the central processing unit 100 may be configured separately. For example, the deactivation apparatus 300, or 500, or 700, may be configured as a chip connected to the central processing unit 100, with its functions being realized under control of the central processing unit 100.

As shown in FIG. 8, the UE 800 may further include a communication module 110, an input unit 120, an audio processor 130, a memory 140, a camera 150, a display 160 and a power supply 170. Functions of the above components are similar to those in the relevant art, and shall not be described herein any further. It should be noted that the UE 800 does not necessarily include all the parts shown in FIG. 8, and furthermore, the UE 800 may include parts not shown in FIG. 8, and the relevant art may be referred to.

It can be seen from the above embodiment that a new deactivation timer restart triggering mechanism is introduced for an SCell carrying one or more PUCCHs, or an UE autonomous deactivation mechanism is not configured for an SCell carrying one or more PUCCHs, or a new deactivation timer mechanism is introduced for a secondary PUCCH cell group. Hence, a case will not occur where understanding of an activation state of a secondary cell by the UE and the base station is inconsistent due to the UE autonomous deactivation mechanism.

Embodiment 8

Figure 9:
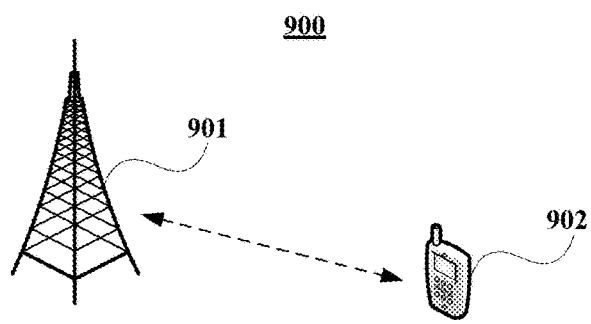
FIG. 9 is a schematic diagram of the communications system of Embodiment 8 of this disclosure.

An embodiment of this disclosure provides a communications system, with contents identical to those in embodiments 1-7 being not going to be described herein any further. FIG. 9 is a schematic diagram of the communications system of the embodiment of this disclosure. As shown in FIG. 9, the communications system 900 includes a base station 901 and a UE 902.

The UE 902 is configured with a first SCell carrying a PUCCH and a second SCell carrying no PUCCH, the first SCell and one or more second SCells transmitting uplink control information via the PUCCH of the first SCell constituting a secondary PUCCH cell group; and the UE 902 is further configured with a PCell carrying a PUCCH, the PCell and one or more second SCells transmitting uplink control information via the PUCCH of the PCell constituting a primary PUCCH cell group.

the UE 902 is further configured to restart a deactivation timer associated with the first SCell carrying the PUCCH, in a case where a deactivation timer is restarted or a channel quality indicator report is transmitted in any second SCell in the secondary PUCCH cell group;

or, the UE 902 is further configured to configure the first SCell carrying a PUCCH as not operating a deactivation timer, or configure a value of a deactivation timer of the first SCell as being greater than a value of a deactivation timer of the second SCell;

or, the UE 902 is further configured to configure the secondary PUCCH cell group with a secondary cell group deactivation timer; and restart the secondary cell group deactivation timer in a case where any SCell of the secondary PUCCH cell group satisfies a timer restart condition.

An embodiment of the present disclosure provides a computer readable program code, which, when executed in a UE, will cause a computer unit to carry out the deactivation apparatus for an SCell described in Embodiment 1, or 3, or 5, in the UE.

An embodiment of the present disclosure provides a computer readable medium, including a computer readable program code, which will cause a computer unit to carry out the deactivation apparatus for an SCell described in Embodiment 1, or 3, or 5, in a UE.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A deactivation apparatus for a secondary cell (SCell), configured in a user equipment (UE), the UE being configured with a first SCell carrying a physical uplink control channel (PUCCH) and at least one second SCell carrying no PUCCH wherein the deactivation apparatus comprises:
a memory that stores a plurality of instructions; and
a processor coupled to the memory and configured to execute the instructions to:
configure the first SCell carrying a PUCCH to be activated and deactivated by an activation/deactivation media access control (MAC) control element (CE), wherein the first SCell carrying PUCCH transmits uplink control information (UCI) for the first SCell and the at least one second SCell;
and the first SCell carrying the PUCCH is not configured with a deactivation timer, wherein an activation state of the first SCell is controlled via the MAC CE to ensure the activation state of the first SCell is synchronized with the UE and a network side and the UCI for the first SCell and the at least one second SCell is received at the network side.

2. A communications system comprising:
a UE configured with a PCell carrying a physical uplink control channel (PUCCH) and a first SCell carrying a PUCCH and at least one second SCell carrying no PUCCH, wherein uplink control information (UCI) for the at least one second SCell carrying no PUCCH is transmitted by at least one of the PCell and the first SCell wherein the UE comprises:

a memory that stores a plurality of instructions; and a processor coupled to the memory and configured to execute the instructions to:

configure the first SCell carrying a PUCCH to be activated and deactivated by an activation/deactivation media access control (MAC) control element (CE); and the first SCell carrying the PUCCH is not configured with a deactivation timer, wherein an activation state of the first SCell is controlled via the MAC CE to ensure the activation state of the first SCell is synchronized with the UE and a network side and the UCI for the first SCell and the at least one second SCell is received at a network side.

3. A User Equipment (UE) configured with a PCell carrying a physical uplink control channel (PUCCH), a first SCell carrying a PUCCH and a plurality of second SCells carrying no PUCCH, the UE comprising:

a memory that stores a plurality of instructions; and a processor coupled to the memory and configured to execute the instructions to:

configure the first SCell carrying a PUCCH to be activated and deactivated by an activation/deactivation media access control (MAC) control element (CE), wherein when activated the first SCell transmits its own uplink control information (UCI) and at least one of the first SCell the PCell transmit UCI for the plurality of second SCells carrying no PUCCH; and the first SCell carrying PUCCH is not configured with a deactivation timer wherein an activation state of the first SCell is controlled via the MAC CE to ensure the activation state of the first SCell is synchronized with the UE and a network side the UCI for the first SCell and the plurality of second SCells is received at a network side.

* * * * *